United States Patent
Widdowson et al.

(10) Patent No.: US 7,084,532 B2
(45) Date of Patent: Aug. 1, 2006

(54) DECOUPLING OF ACTUATORS FOR POSITIONING AN OBJECT

(75) Inventors: Gary Peter Widdowson, Kwai Chung (HK); Man Chung Raymond Ng, Kwai Chung (HK); Yen Hsi Terry Tang, Kwai Chung (HK)

(73) Assignee: ASM Assembly Automation Ltd., Hong Kong (HK)

( * ) Notice: Subject to any disclaimer, the term of this patent is extended or adjusted under 35 U.S.C. 154(b) by 165 days.

(21) Appl. No.: 10/792,472

(22) Filed: Mar. 3, 2004

(65) Prior Publication Data

US 2005/0194841 A1 Sep. 8, 2005

(51) Int. Cl.
*H02K 41/00* (2006.01)
(52) U.S. Cl. .......................................... 310/12; 355/72
(58) Field of Classification Search .................. 310/12; 355/53, 72
See application file for complete search history.

(56) References Cited

U.S. PATENT DOCUMENTS 6,720,683 B1 * 4/2004 Bundschu et al. ............ 310/12
6,842,226 B1 * 1/2005 Watson et al. ................ 355/72

* cited by examiner

*Primary Examiner*—Karl Tamai
*Assistant Examiner*—Judson H. Jones
(74) *Attorney, Agent, or Firm*—Ostrolenk, Faber, Gerb & Soffen, LLP

(57) ABSTRACT

The invention provides an apparatus and a method for positioning an object coupled to a first support structure and a second support structure. A first actuator drives the first support structure along a first axis and a second actuator drives the first support structure along a second axis orthogonal to the first axis. A third actuator comprising a forcer and a stator is provided for driving the second support structure that is guided for movement relative to the first support structure along a third axis orthogonal to the first and second axes. The forcer is coupled to the second support structure and is movable with respect to the stator, and the stator is relatively stationary and decoupled from the second support structure.

20 Claims, 3 Drawing Sheets

DECOUPLING OF ACTUATORS FOR POSITIONING AN OBJECT

FIELD OF THE INVENTION

The invention relates to the use of motorized actuators cooperating to drive and position an object, such as an end effector attached to an XYZ linear motion table, in different orthogonal directions.

BACKGROUND AND PRIOR ART

Linear motion tables that are movable in orthogonal X, Y and Z axes (also called XYZ linear motion tables) have gained popularity in the machine tool and semiconductor industries due to the complexity of motion combinations demanded for the applications used in such industries. One common application is the use of actuators for driving an object, for example a semiconductor bond head which is attached to a support structure such as a table or platform. By controlling the position of the platform or table, the bond head may be positioned accordingly.

The simplest configuration for an XYZ linear motion system is with three overlying linear motion tables, the motion of each table being controlled by an actuator coupled to the table and serving to drive the table along one of the orthogonal motion axes. In this design, the weight of an actuator controlling an overlying table may generally be supported by another table since the actuator is designed to move with the other table. However the size as well as the weight of the actuator supported by another table and driven by another actuator are obstacles in obtaining high speed motion and position with extreme accuracy. When the loads on the motion axes are increased, various problems such as vibration of the structure arise so that complexity of the system may need to be increased to try to contain the problems. It is therefore desirable to reduce the load being carried or driven by each actuator.

In order to minimize the effect of increased weight on motion stability, several mechanisms which sought to decouple the dummy loads from the motion axes were developed. "Decoupling" in this sense means eliminating the interrelationship between one actuator and another so that the whole weight of one actuator is not carried or supported by the other actuator. Unlike tables that are only movable in the X and Y axes which only require one actuator to be at least partially decoupled from another table along an orthogonal motion axis, a prerequisite to having a decoupled XYZ table also involves the decoupling of a third actuator from another two motion axes.

In most conventional XYZ linear motion systems, at least two actuators are coupled to each other to a certain extent. Failure to decouple the various motion axes means that at least one table and actuator is required to take up the dummy load of another table and actuator. The additional load may well be insignificant if the actuators consist of solenoid, pneumatic cylinder motor or the like which have relatively smaller weights. However, with demand increasing for higher positioning accuracy and faster acceleration, the use of a linear motor having a heavy stator weight would cause greater concern.

A prior art apparatus which decouples a third actuator from a table driven by another two actuators is shown in FIG. 1. The three co-ordinate axes of a Cartesian system of co-ordinates are marked with X, Y, and Z, wherein the Z axis corresponds to a vertical direction. A compound table 44, which is driven by an X actuator 41 and a Y actuator 42, is movable along the two motion axes X and Y. These two motion axes can either be coupled or decoupled. A Z table 45 is guided relative to the compound table 44 by a pair of guidings 46 on the compound table 44 and is movable in the Z direction. A Z actuator 43 drives the Z table 45 to move in the Z direction through a contact 40 connected to an auxiliary coupler 47. This coupler 47, which is guided by a stationary rail 50, is movable in the Z direction. The contact 40 can be constructed with sliding material, a rolling ball or the like so that it can slide over a surface 48 of the Z table 45 while the compound table 44 moves along the X and Y directions. Permanent contact between the contact 40 and the surface 48 is ensured by the use of a tension spring 49, which is preloaded between the compound table 44 and the Z table 45. Thus, the Z actuator 43 can be mounted to a separate support and is decoupled from the motion tables 44, 45 while they are being driven by the X and Y actuators:

The actuators 41, 42 and 43 for these linear motion tables 44 and 45 may comprise mechanical, electrical or pneumatic means for providing linear motion. An end effector (not shown) mounted on the Z table 45 is capable of being moved in the X, Y and Z directions through a combination of movements of the respective motion tables 44, 45.

As compared to an XYZ table in a stacked configuration where the Z table is directly mounted on another table, the above XYZ table decouples the Z actuator 43 from the X and Y motion axes. Thus the dummy load due to the weight of the Z actuator mounted on another table can be avoided. However, the wearing out of the auxiliary coupler 47 as well as the surface 48 after prolonged use of the system may adversely affect both the leveling and positional accuracy of the XYZ table.

Planarity and smoothness for achieving positional and leveling accuracy of the Z table is an important factor for improving machining quality and to avoid backlash of the mating surfaces. However the wearing out of the above contacted parts is inevitable due to the friction produced between surfaces. Furthermore, the force from the anti-backlash or tension spring which keep the mating surfaces in permanent contact should be great enough, otherwise the table will oscillate due to slow response to actuation during fast acceleration. This causes an increase in the frictional forces which will expedite the wearing of the contacted parts.

SUMMARY OF THE INVENTION

The invention therefore seeks to provide a plurality of actuators to drive an object in different orthogonal axes, wherein at least one of the actuators is at least partially decoupled from the other actuators while avoiding some of the disadvantages of the prior art as described above.

According to a first aspect of the invention, there is provided an apparatus for positioning an object coupled to a first support structure and a second support structure comprising: a first actuator for driving the first support structure along a first axis; a second actuator for driving the first support structure along a second axis orthogonal to the first axis; and a third actuator comprising a forcer and a stator for driving the second support structure that is guided for movement relative to the first support structure along a third axis orthogonal to the first and second axes; wherein the forcer is coupled to the second support structure and is movable with respect to the stator, and the stator is relatively stationary and decoupled from the first support structure and the second support structure.

According to a second aspect of the invention, there is provided a method of positioning an object coupled to a first support structure and a second support structure comprising: driving the first support structure along a first axis; driving the first support structure along a second axis orthogonal to the first axis; providing an actuator comprising a forcer coupled to the second support structure that is movable with respect to a relatively stationary stator; driving the forcer to move relative to the stator along a third axis orthogonal to the first and second axes while guiding movement of the second support structure relative to the first support structure; and decoupling the stator from the first support structure and the second support structure and maintaining the stator relatively stationary.

It will be convenient to hereinafter describe the invention in greater detail by reference to the accompanying drawings which illustrate one embodiment of the invention. The particularity of the drawings and the related description is not to be understood as superseding the generality of the broad identification of the invention as defined by the claims.

BRIEF DESCRIPTION OF THE DRAWINGS

An example of an apparatus and method according to the preferred embodiments of the invention will now be described with reference to the accompanying drawings, in which.

DETAILED DESCRIPTION OF THE PREFERRED EMBODIMENT

Figure 1:
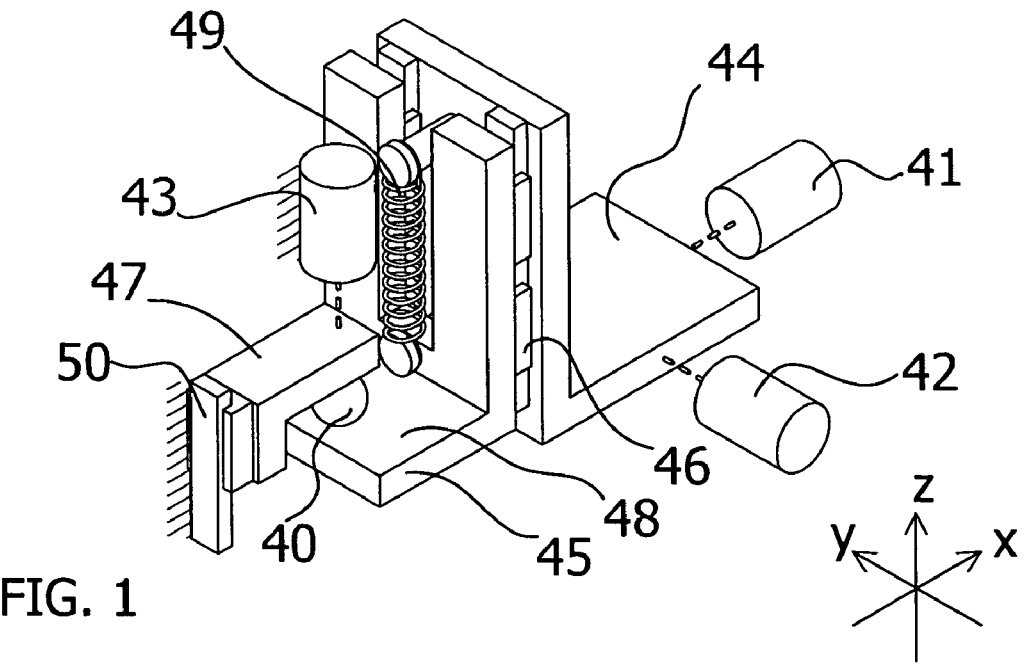
FIG. 1 is a kinematic layout view of a prior art XYZ linear motion table.
Figure 2:
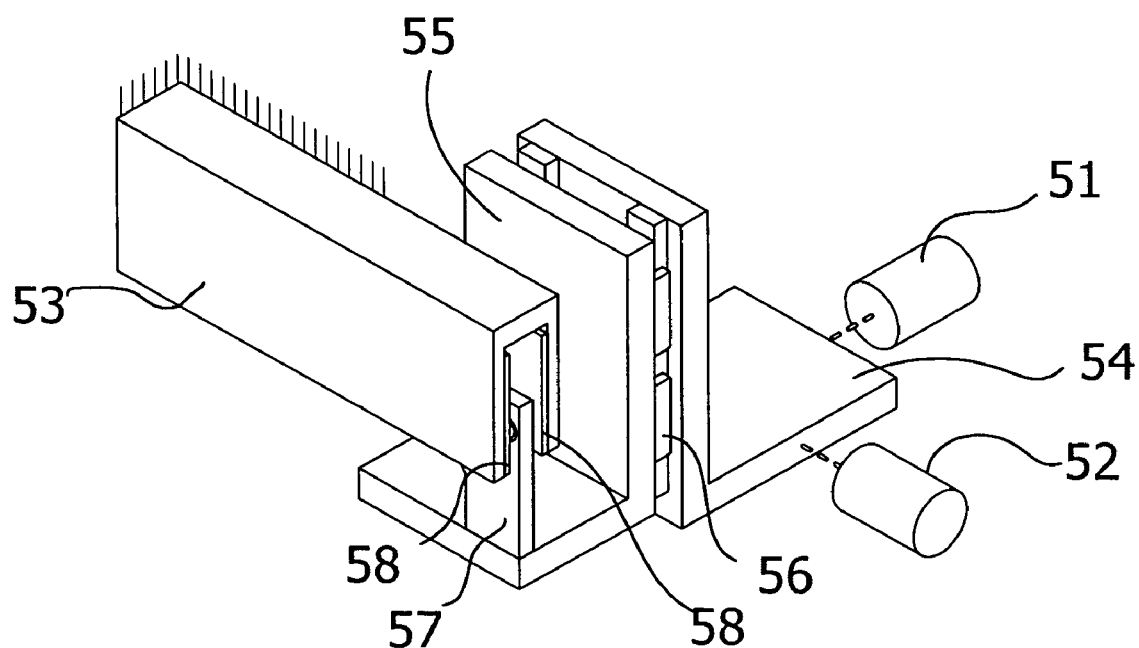
FIG. 2 is a kinematic layout view of an XYZ linear motion table according to a first preferred embodiment of the invention.

FIG. 2 is a kinematic layout view of an XYZ linear motion table according to a first preferred embodiment of the invention. The apparatus is shown in kinematic layout view to emphasize its decoupling mechanism as compared to the prior art in FIG. 1. A first support structure in the form of a compound table 54 driven by first and second X and Y actuators 51, 52 is movable along first and second motion axes X and Y respectively. The X and Y actuators 51, 52 of these two motion axes can either be coupled or decoupled. The actuators 51, 52 can drive the compound table 54 by mechanical, electrical or pneumatic means to impart linear motion. A second support structure in the form of a Z table 55 which is guided by a pair of guidings 56 on the compound table 54 is movable by a third actuator in the Z direction. Unlike the Z table 45 in FIG. 1 which may be driven by any kind of actuator, the Z table 55 here is driven by a linear motor 53 along a third or Z axis. However, the linear motor 53 is constructed with space allowances in between the forcer (i.e. the movable part of the motor, in this example it is the coil bracket 57) and the stator (i.e. the stationary part of the motor, which are the magnet layings 58 in this example) such that the forcer, instead of being confined to move along its energized motion axis as in most conventional linear motor systems, is also allowed to move in the X and Y directions while the Z table is being moved by the X and Y actuators 51 and 52 together with the compound table 54. The forcer or coil bracket 57 is disposed adjacent to the stator or magnet layings 58 and extend substantially parallel to a plane lying along the Y-Z axes.

The space or gap provided (in the X axis here) between the forcer and the stator determines the axis from which the Z table 55 is to be decoupled and also the distance that it can travel. The total gap should be greater than the distance movable by an object along that axis. As the forcer is movable relative to the stator inside the space, no additional mechanical coupler and guidings are required for this embodiment. Additionally, the stator of the Z linear motor 53, which is decoupled from the motion tables 54 and 55, can be mounted to a separate stationary support surface and decoupled from the Z table 55 such that its dummy load, especially the weight of the linear motor bracket, can be eliminated. An object to be positioned is coupled to the first and second support structures in the form of the motion tables 54, 55. In this embodiment, the object is mounted on the Z table 55 and is capable of being moved in the X, Y and Z directions by a combination of movements of the respective tables 54, 55.

Figure 3:
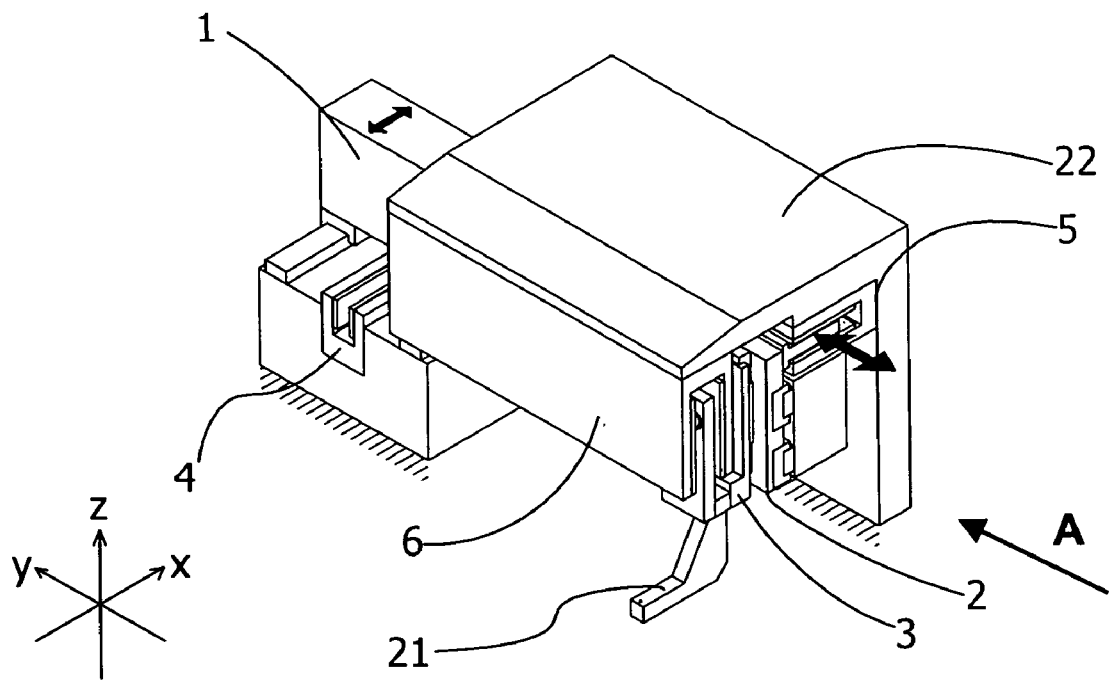
FIG. 3 is an isometric view of an XYZ table that employs the principles illustrated in FIG. 2.

FIG. 3 is an isometric view of an XYZ table that employs the principles illustrated in FIG. 2. The XYZ table comprises as its major components three linear motion tables 1, 2 and 3, that are movable in the X, Y and Z axes of motion respectively. Preferably, the X table 1 is driven by an X linear motor 4 as shown. However, the linear motion can be actuated by mechanical, electrical or pneumatic means as long as the linear motion in the X direction is provided, whereas the Y table 2 and Z table 3 are driven by Y and Z linear motors or actuators 5, 6 respectively. All the linear motors or actuators 4, 5 and 6 are decoupled, in the sense that most of the weight of each of the motors is independently supported by support surfaces that are separate from the motion tables 1, 2, 3. The X actuator 4 is mounted in a stationary manner to a base while the Y and Z actuators 5, 6 are supported by a stationary stand 22. Details of the construction of the apparatus is now described with the aid of FIG. 4.

Figure 4:
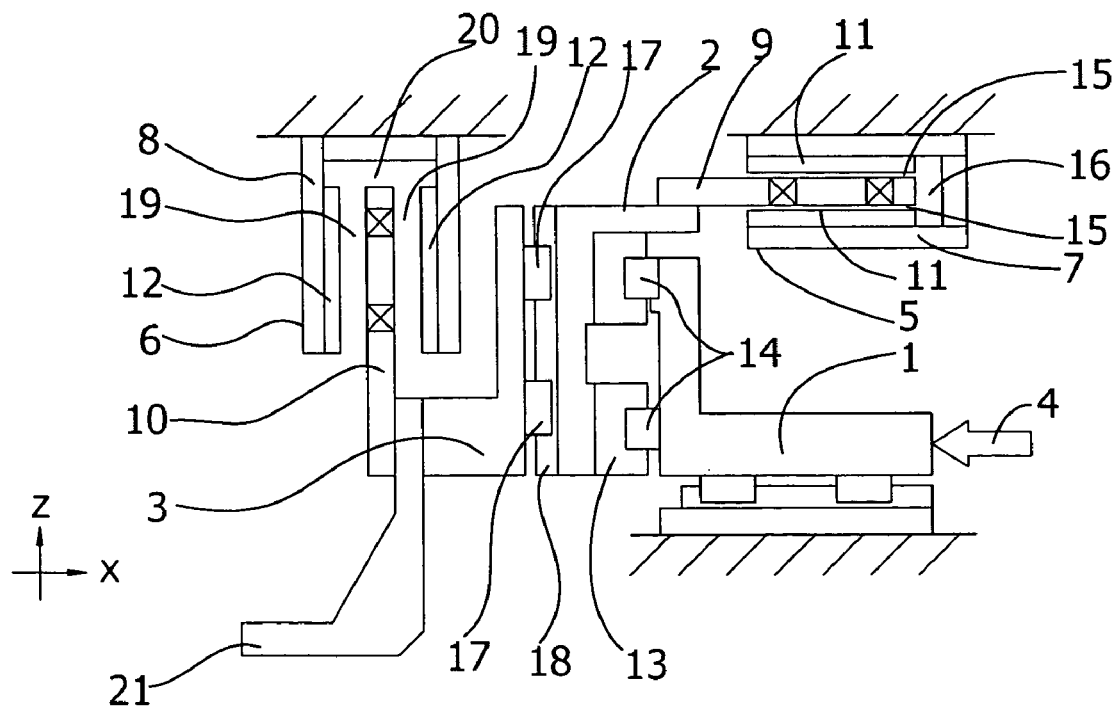
FIG. 4 is a schematic diagram of the XYZ table, looking from direction A of FIG. 3 along the Y axis.
Figure 5A:
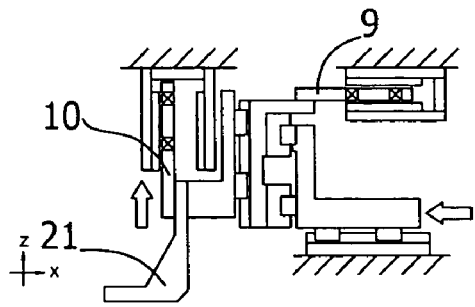
FIGS. 5a–5d are schematic diagrams looking from positions similar to FIG. 4, illustrating different positions of the XYZ table corresponding to four extreme positions of the coil brackets of its Y and Z linear actuators.
Figure 5B:
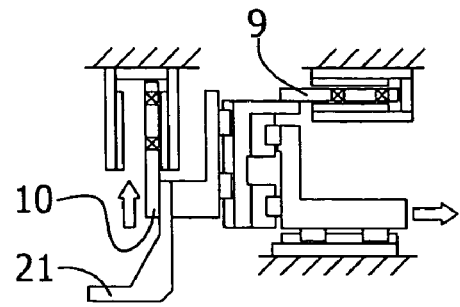
Figure 5C:
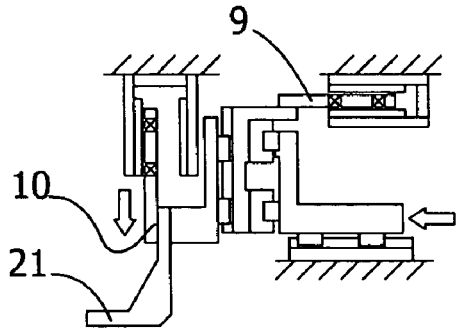
Figure 5D:
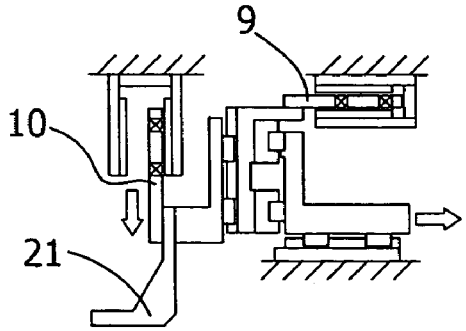

FIG. 4 is a schematic diagram of the XYZ table, looking from direction A of FIG. 3 along the Y axis. The first or X actuator 4, which can comprise any kind of motor, is represented by a symbolic arrow. The Y and Z linear motors or second and third actuators 5, 6 are each comprised of a forcer such as a coil bracket 9, 10 including coil windings, and a stator such as permanent magnet layings 11, 12 in a motor housing bracket 7, 8. The magnet layings 11, 12 are disposed on two opposite inner walls of the motor housing brackets 7, 8. The magnets are arranged and extended in a direction of travel along the path which each linear motor 5, 6 moves the coil bracket 9, 10. Adjacent magnets have alternating polarity, so as to interact with the magnetic field generated by the coils in the coil brackets 9, 10. This can produce translational forces to drive the Y and Z tables 2, 3 to move. Between these walls, sufficient space is provided for the coil brackets 9, 10 to translate longitudinally along the length of the motors in both the X and Y directions. The X actuator 4 as well as the motor housing brackets 7, 8 of the second and third actuators 5, 6 may all be mounted on stationary surfaces. Accordingly, magnet layings 12 are substantially parallel to a plane lying along the Y-Z axes, and the coil bracket 10 also extends substantially parallel to the plane.

The Y table 2 comprised in the first support structure, which is attached to a second forcer such as Y coil bracket 9, is mounted on Y sliders 13 such that their motions are guided by the Y guide rails 14 which are mounted on the X table 1. In order to prevent the Y coil bracket 9 from colliding with the Y motor bracket 7 during its travel in the X direction, a sufficient Y recess 16 is provided such that there is enough room for the coil bracket 9 to move in the Y axis.

Constant air gaps 15 are also provided on both sides of the Y coil bracket 9 and the magnet layings 11 in the X axis so that there is enough room for the Y coil bracket 9 to move in the X direction between the magnet layings 11 but not touching their surfaces. Therefore the Y coil bracket 7, besides travelling in the Y direction as activated by its own linear motor 5, is also movable in compliance with the movement of the X table 1. Through this magnetic decoupling mechanism, the actuators for the X and Y tables 1, 2 can be at least partially decoupled and mounted in a stationary manner. The Y coil bracket 9 or second forcer and Y magnet layings 11 or second stator both extend substantially parallel to a plane lying along the X-Y axes.

Similarly, the second support structure or Z table 3 to which the Z coil bracket 10 is attached is mounted on Z sliders 17 such that the motion of the Z table 3 is guided by Z guide rails 18 relative to the Y table 2. In turn the Z guide rails 18 are mounted on the Y table 2 so that the Z table 3 is movable not only in the Z direction but also in the direction which the Y table 2 travels. Since the Y table 2 is movable in both the X and Y directions, an object as represented by end effector 21 attached on the Z table 3 is capable of moving in any combination of X, Y and Z motions. The end effector 21 may include a semiconductor bond head. In order to prevent the Z coil bracket 10 from colliding with the Z housing bracket 8, a sufficient Z recess 20 is provided for the coil bracket 10 such that there is enough room for the Z coil bracket 10 to move in the Z direction. Unlike the Y air gaps 15 which are kept relatively constant during the movement of the Y coil bracket 9 in the X and Y directions, the air gaps 19 between the Z coil bracket 10 and the Z magnet layings 12 are large enough so that there is enough room for the Z coil bracket 10 to travel in the X direction without hitting the surfaces of the Z magnet layings 12. The total air gaps 19 are therefore greater than the distance movable by the object or end effector 21 in the X axis.

For simplicity of explanation, the motions of the tables in the X, Y and Z directions are now described separately. It should be noted that their motions can be in any combination and occur in different sequences and/or concurrently in normal operation. For X movement, the X table 1 is driven by the X actuator 4. There is no preference as to the kind of motor so long as linear motion is provided. Since the Y sliders 13 engage with the Y guide rails 14 which are mounted on the X table 1, the movement of the X table 1 carries the Y table 2 together with the Y coil bracket 9. Likewise the Z table 3 with the Z guide rails 18 mounted on the Y table 2 move with the X table 1. The Y and Z coil brackets 9, 10 which are mounted on the Y table 2 and Z table 3 respectively also move in the X direction corresponding to the movement of the X table 1. The distance by which the X table 1 can travel is determined by the size of the Z air gaps 19. The air gaps 19 are large enough for providing sufficient space for the Z coil bracket 10 to travel on the X axis in either direction inside the Z housing bracket 8. However, in order to prevent the coil bracket 9, 10 from contacting or colliding with the motor brackets 7 and 8, stoppers (not shown) are provided on the apparatus mounted on both ends of the X table 1 to limit the amount of its travel. Both the Y linear motor 5 as well as the Z linear motor 6 are, therefore, partially decoupled from the X table 1 and their stators can be mounted in a stationary manner to stationary surfaces that are decoupled from the object.

For Y movement, as the coils in the Y coil bracket 9 are energized, the magnetic fields generated by the coils interact with the Y magnet layings 11 on both sides. The magnets in the Y linear motor 5 are arranged and extended along the direction of travel so that adjacent magnets have alternating polarity which can produce translational forces to drive the Y table 2 to move. The coils in the Y coil bracket 9 are arranged in such a way that they are always enclosed by the Y magnet layings 11 regardless of the X and Y positions of the Y table 2. Thus, a sufficient magnetic field from the permanent magnets in the magnet layings 11 is ensured for producing enough translational force to drive the Y table 2 to move. Magnet layings 11 or second stator and Y coil bracket 9 or second forcer extend substantially parallel to a plane lying on the X-Y axes.

The Z guide rails 18 which guide the Z movement of the Z table 3 are mounted on the Y table 2. Thus, the Z table 3 where the Z coil bracket 10 is mounted moves with the Y table 2 in the Y direction. Stoppers (not shown) are provided on both ends of the Y housing bracket 7 of the Y linear motor 2 to limit the amount by which the Y table 2 can travel.

In order to decouple the Z linear motor 6 from the Y table 2, the magnet layings 12 in the Z linear motor 6 are arranged and extended in both the Y and Z directions such that the coils in the Z coil bracket 10 are always enclosed by the magnet layings 12 regardless of the X, Y and Z positions of the Z table 3. As the coils in the Z coil bracket 10 are energized, a sufficient magnetic field from the permanent magnets in the magnet layings 12 is ensured to produce translational forces to drive the Z table 3 to move in the Z direction. Stoppers are provided (not shown) to limit the amount by which Z table 3 can travel.

The movements of the Y and Z tables 2, 3 are controlled by motion drivers (not shown) which control the excitation of the linear motors 5, 6. Each table is provided with an encoder (not shown) so that its current position can be monitored and fed back to a processor for precise positioning.

FIGS. 5*a*–5*d* are schematic diagrams looking from positions similar to FIG. 4, illustrating different positions of the XYZ table corresponding to four extreme positions of the coil brackets of its Y and Z linear actuators 5, 6. There are altogether eight possible extreme positions. The extreme positions in the −X and +Z, +X and +Z, −X and −Z, +X and −Z axes, are shown in FIGS. 5*a*, 5*b*, 5*c* and 5*d* respectively. For simplicity, the diagrams for the other four extreme positions at the extreme Y positions, which would be similar to those diagrams as seen along the Y axis in FIGS. 5*a*–5*d*, are omitted.

Figure 6:
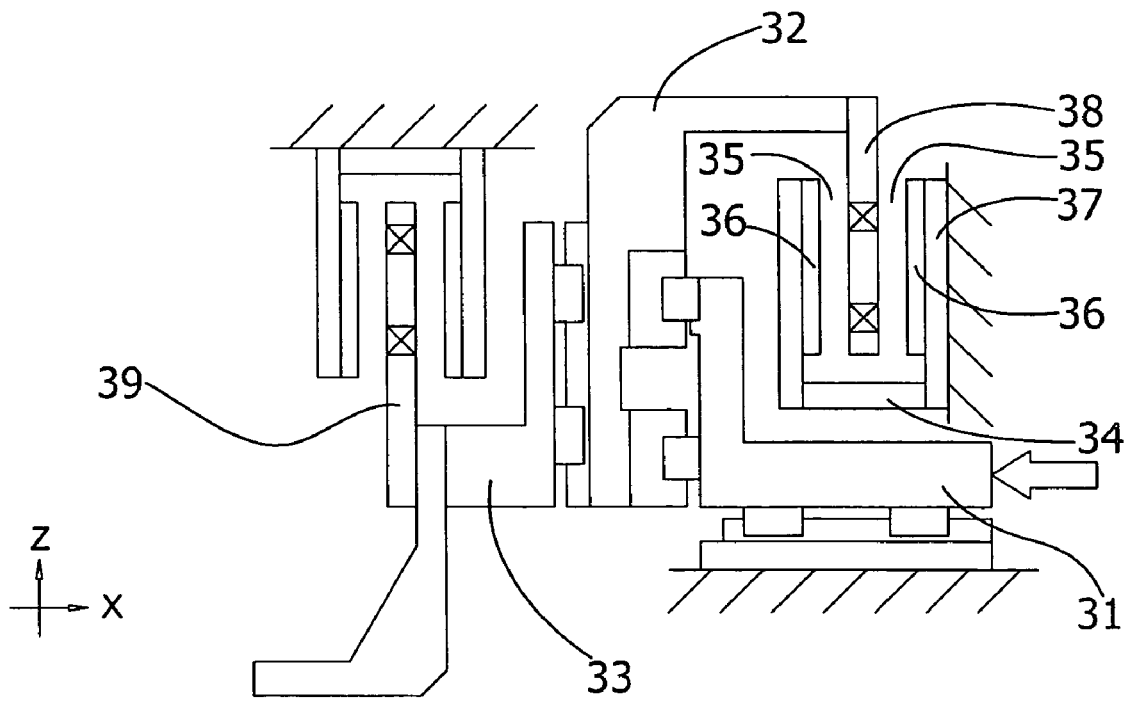
FIG. 6 is a schematic diagram showing an XYZ table according to a second preferred embodiment of the invention.

FIG. 6 is a schematic diagram showing an XYZ table according to a second preferred embodiment of the invention. The main difference between the second embodiment and the first embodiment is in the arrangement of the Y linear motor 34. The Y coil bracket 38, instead of being mounted orthogonally to the Z coil bracket as in FIG. 4, is now aligned in parallel with the Z coil bracket 39. The second forcer and second stator therefore extend substantially parallel to a plane lying along the Y-Z axes. Unlike the embodiment shown in FIG. 4, where constant air gaps 15 are maintained in between the Y coil bracket and the magnet layings, the air gaps 35 are large enough for providing enough room for the Y coil bracket 38 to travel in the X axis in either direction between the magnet layings 36 inside the Y motor bracket 37. The total size of the Y air gaps 35 are greater than the distance movable by the object along the X axis. For the sake of brevity, further discussion of the motion of the tables 31, 32 and 33, which are similar to the description relating to the first embodiment described in FIG. 4, will not be reiterated.

For the illustrated invention, the linear motors are in the form of a U-channel. However, it goes without saying that various configurations of linear motors are applicable, such as flat type or U-type, whether they are in single phase or in multiple phases.

Additionally, although the present examples are illustrated with movable Y and Z coil brackets relative to the stationary motor housing brackets, the tables can be driven by a forcer comprising a movable magnet with a stator comprising a stationary coil bracket with coil windings instead.

Furthermore, in the above embodiment, although the movement of the X and Y tables are driven by linear motors, movement can also be accomplished by mechanical, electrical or pneumatic means as long as linear motion in the corresponding directions are provided. However, at least one table should preferably be driven by linear motor for decoupling the same.

In the above embodiments, although the X and Y actuators are decoupled by applying a magnetic decoupling mechanism, it goes without saying that they can also be decoupled by various other mechanisms. Additionally, the invention is still applicable when the X and Y actuators are not decoupled.

It should be noted that the arrangements of the X, Y and Z tables are examples of the present invention. It is not possible to describe every conceivable combination of components for purposes of describing the present invention. Many further combinations and permutations of the present invention are possible.

The preferred embodiments of the invention offer the advantages of high speed, high acceleration and positional accuracy gleaned from the implementation of linear motors without sacrificing its structural stability in order to carry extra loadings of the motors. Unlike the prior art using a mechanical decoupling method, the preferred embodiments do not require additional auxiliary decouplers or guidings. Therefore the vibrations from these sources are eliminated.

Whilst the movement of the Z coil bracket is coupled to the Y coil bracket, the movement of Y coil bracket in Y direction is decoupled from the Z coil bracket. Thus, although the weights of the coils brackets are still carried, the actuators are substantially decoupled since the weight of the rest of the actuator (such as the relatively heavier magnet layings) is not carried. The extra loading that the Y coil bracket carries during Y movement is comparative small and is the least as compared to the prior art stacked configuration and mechanical decoupling configuration. In the described embodiments, the extra load that the Y table carries is only the weight of the Z coil bracket. Comparatively, it is the weight of the auxiliary decoupler and the extra guidings that is supported in the prior art using a mechanical decoupling device, and the weight of the whole Z actuator that is supported in the prior art using a stack configuration.

The invention described herein is susceptible to variations, modifications and/or additions other than those specifically described and it is to be understood that the invention includes all such variations, modifications and/or additions which fall within the spirit and scope of the above description.

The invention claimed is:

1. An apparatus for positioning an object coupled to a first support structure and a second support structure comprising:
   a first actuator for driving the first support structure along a first axis;
   a second actuator for driving the first support structure along a second axis orthogonal to the first axis; and
   a third actuator comprising a forcer and a stator for driving the second support structure that is guided for movement relative to the first support structure along a third axis orthogonal to the first and second axes;
   wherein the forcer is coupled to the second support structure and is movable with respect to the stator, and the stator is relatively stationary and decoupled from the first support structure and the second support structure.

2. An apparatus as claimed in claim 1, wherein the forcer and stator are disposed adjacent to each other and extend substantially parallel to a plane lying along the second and third axes.

3. An apparatus as claimed in claim 2, including a gap between the forcer and stator along the first axis that is greater than the distance movable by the object along the first axis.

4. An apparatus as claimed in claim 3, including stoppers mounted on the apparatus that are operative to prevent contact between the forcer and the stator along the first axis.

5. An apparatus as claimed in claim 1, wherein the second actuator comprises a second forcer movable with respect to a relatively stationary second stator, and the second forcer is coupled to the first support structure and the second stator is decoupled from the first support structure.

6. An apparatus as claimed in claim 5, wherein the second forcer and second stator are disposed adjacent to each other and extend substantially parallel to a plane lying along the first and second axes.

7. An apparatus as claimed in claim 5, wherein the second forcer and second stator are disposed adjacent to each other and extend substantially parallel to a plane lying along the second and third axes.

8. An apparatus as claimed in claim 7, including a gap between the second forcer and the second stator along the first axis, the size of the gap being greater than the distance movable by the object along the first axis.

9. An apparatus as claimed in claim 1, wherein the stator is mounted to a stationary surface that is decoupled from the object.

10. An apparatus as claimed in claim 1, wherein the forcer comprises a coil bracket including coil windings.

11. An apparatus as claimed in claim 1, wherein the stator comprises permanent magnet layings disposed on either side of the forcer.

12. A method of positioning an object coupled to a first support structure and a second support structure comprising:
   driving the first support structure along a first axis;
   driving the first support structure along a second axis orthogonal to the first axis;
   providing an actuator comprising a forcer coupled to the second support structure that is movable with respect to a relatively stationary stator;
   driving the forcer to move relative to the stator along a third axis orthogonal to the first and second axes while guiding movement of the second support structure relative to the first support structure; and decoupling the stator from the first support structure and the second support structure and maintaining the stator relatively stationary.

13. A method as claimed in claim 12, wherein the forcer and stator are disposed adjacent to each other and extend substantially parallel to a plane lying along the second and third axes.

14. A method as claimed in claim 13, including moving the forcer relative to the stator along the first axis within a gap formed between the forcer and stator along the first axis to allow movement of the forcer along the first axis without contacting the stator.

15. A method as claimed in claim 14, wherein the size of the gap between the forcer and the stator is greater than the distance movable by the object along the first axis.

16. A method as claimed in claim 14, including stopping movement of the forcer to prevent contact between the forcer and the stator.

17. A method as claimed in claim 12, including providing a second actuator comprising a second forcer coupled to the second support structure that is movable with respect to a relatively stationary second stator, driving the second forcer to move relative to the second stator along the second axis and decoupling the second stator from the first support structure and maintaining the second stator relatively stationary.

18. A method as claimed in claim 17, wherein the second forcer and second stator are disposed adjacent to each other and extend substantially parallel to a plane lying along the first and second axes.

19. A method as claimed in claim 17, wherein the second forcer and second stator are disposed adjacent to each other and extend substantially parallel to a plane lying along the second and third axes.

20. A method as claimed in claim 19, including moving the second forcer relative to the second stator along the first axis with a gap formed between the second forcer and the second stator, the size of the gap being greater than the distance movable by the object along the first axis.

* * * * *